Patented Apr. 3, 1951

2,547,678

UNITED STATES PATENT OFFICE 2,547,678

LIQUID POLYSILOXANES

Donald F. Wilcock, Saugus, Mass., and Dallas T. Hurd, Schenectady, N. Y., assignors to General Electric Company, a corporation of New York No Drawing. Application October 11, 1946, Serial No. 702,589

9 Claims. (Cl. 260—448.2)

This invention relates to new and useful synthetic liquid compositions and methods of preparing the same. More particularly, the invention is concerned with fluid or oily compositions comprising a liquid mixture of linear hydrogen polysiloxanes wherein substantially all the valences (exclusive of the valences of silicon satisfied by oxygens) of all the silicon atoms intermediate the terminal silicon atoms are satisfied by having hydrogen atoms attached thereto.

It was known prior to our invention that there could be produced linear polysiloxanes corresponding to the general formula I 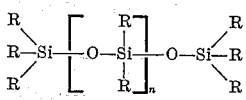

in which the various R's represent the same or different lower monovalent hydrocarbon radicals, more particularly hydrocarbon radicals selected from the class consisting of lower alkyl, aryl, alkaryl and aralkyl radicals, and $n$ is an integer equal to at least 1. Such linear polysiloxanes and methods of preparation are more fully described and claimed in the copending application of Winton I. Patnode, Serial No. 463,814, filed October 29, 1942, now U. S. Patent 2,496,888, and assigned to the same assignee as the present invention. In the pending application of one of us (Donald F. Wilcock), Serial No. 656,162, filed March 21, 1946, now U. S. Patent 2,491,843, and assigned to the same assignee as the present invention, there are disclosed and claimed linear methylpolysiloxanes wherein at least some of the silicon atoms intermediate to the terminal silicon atoms have one hydrogen atom attached thereto. More particularly, these liquid materials comprise a mixture of different linear methylpolysiloxanes corresponding to the general formula II 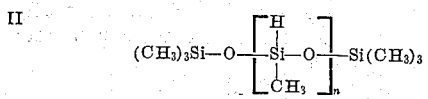

where $n$ represents an integer which is at least 1, for example, from 10 to 500 or more, and which have a viscosity-temperature coefficient of the order of 0.4 to 0.5. In application Serial No. 656,163, filed March 21, 1946, by Robert O. Sauer and assigned to the same assignee as the instant application, there are disclosed and claimed lower molecular weight liquid compositions analogous in structure to the compounds claimed in the Wilcock application filed on the same date (supra).

It was also known prior to our invention that dichlorosilane could be hydrolyzed to yield highly polymeric solids having the empirical formula $(SiH_2O)_x$ where $x$ is a large whole number. It has also been observed that occasionally transient amounts of lower molecular weight liquids obtained in the hydrolysis of dichlorosilane rapidly polymerized to solid materials [Berichte, vol. 50, 1764 (1917); ibid. 52, 1851 (1919)].

The present invention is based on our discovery that a great improvement in the viscosity-temperature coefficient of liquid mixtures of linear polysiloxanes can be obtained if these linear polysiloxanes are of such a structure that all of the silicon atoms intermediate to the terminal silicon atoms have only hydrogens attached thereto (exclusive of the bonding oxygens). More particularly, we have found that liquid materials comprising a mixture of different linear hydrogen polysiloxanes corresponding to the general formula III 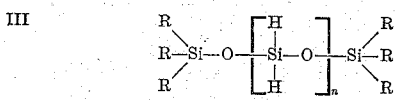

where R is a member of the class consisting of hydrogen and monovalent hydrocarbon radicals, and $n$ represents an integer which is at least 1, for example, from 5 to 500 or more, such liquid materials have a viscosity-temperature coefficient which is unusually small, the viscosity being substantially the same at room temperature (about 25° C.) and at —80° C., or the viscosity at —80° C. is at most not more than 50 per cent greater than the viscosity at room temperature. This was quite surprising and unexpected and in no way could have been predicted since liquid linear methyl polysiloxanes having an average of slightly more than two methyl groups per silicon atom, although they have much better viscosity-temperature coefficients than petroleum oils, they may have a viscosity at —70° C. from 15 to 25 or more times the viscosity measured at 30° C. Because of this low viscosity-temperature coefficient, the liquid or oily compositions of this invention are particularly useful in lubricating, damping, and other applications where they are employed, for example, in a sealed system under non-oxidizing or substantially non-oxidizing conditions and where they encounter extreme changes of temperature, as, for instance, where the requirements are that the liquid or oily compositions be operable under relatively similar viscosity conditions whether at normal temperatures (e. g., 25° C.) or at very low temperatures (e. g., —80° C.).

Illustrative examples of monovalent hydrocarbon radicals which R in the above Formula III may be, are aliphatic, including lower alkyl radicals, (e. g., methyl, ethyl, propyl, isopropyl, etc.), as well as cycloaliphatic radicals (e. g., cyclopentyl, cyclopentenyl, cyclohexyl, etc.); aryl radicals (e. g., phenyl, diphenyl, naphthyl, etc.); alkaryl radicals (e. g., tolyl, xylyl, ethylphenyl, etc.); aralkyl radicals (e. g., benzyl, phenylethyl, etc.); and their homologues, as well as hydrocarbon radicals with one of their hydrogen atoms substituted by, for example, a halogen, for instance, chlorine. Preferably R is a methyl group. It will, of course, be understood by those skilled in the art that all the R's may represent hydrogen, or the R's may represent the same or different monovalent hydrocarbon radicals of the class described above, or the R's may represent hydrogen and monovalent hydrocarbon radicals at the same time.

The fluid compositions of this invention may be used alone or admixed with other liquid materials, for example, with fluid bodies of the kind disclosed in the aforementioned copending Patnode and Wilcock applications, as electrically insulating fluids, hydraulic fluids, damping fluids, lubricants, etc., especially where such mixtures are not subjected to the oxidizing influences of air. For instance, they may be admixed with (1) a liquid cyclic methylpolysiloxane corresponding to the formula [(CH$_3$)$_2$SiO]$_x$, where $x$ is a whole number and is greater than 10; or with (2) a liquid mixture of organopolysiloxanes corresponding to Formula I; or with both (1) and (2). In this way there are obtained liquid compositions having improved viscosity-temperature coefficients as compared with the liquid cyclic methylpolysiloxanes of (1) alone or of (2) alone, or of (1) admixed with (2). These new compositions also may be admixed with various metallic soaps to form greases.

From the foregoing description, it will be seen that the present invention provides liquid or fluid compositions which are suitable for use as lubricants and for other purposes, comprising an oily mixture of linear hydrogen polysiloxanes, at least some of which correspond to the general formula IV 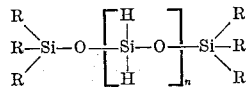

where R is a member of the class consisting of hydrogen and lower monovalent hydrocarbon radicals, and $n$ represents an integer which is at least 1, advantageously at least 5, for example, from 10 to 300 or 400 or even 500 or more, the said oily material containing a plurality of different linear compounds embraced by the above formula. Liquid materials composed of a plurality of different linear hydrogen polysiloxanes corresponding to the general formula V 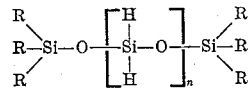

where R has the meaning given above and $n$ represents an integer having an average value of at least 10 or 15, are substantially non-volatile at a temperature of the order of 100° C. at atmospheric pressure, and, in addition, their viscosity is, comparatively speaking, the same within a few centistokes whether the temperature at which the viscosity is measured is at about 25° C. or at −80° C. Of particular value are fluid or oily compositions comprising a preponderant proportion, for example, from 55 to 99 per cent or more, by weight, of the composition of different liquid linear hydrogen polysiloxanes, the individual members of which correspond to the general formula VI 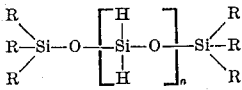

where R has the meaning stated previously and $n$ represents an integer between 10 and 500.

Various methods may be employed for preparing the liquid compositions of this invention, that is, fluid compositions comprising a liquid mixture of linear hydrogen polysiloxanes wherein substantially all of the valences of all the silicon atoms intermediate the terminal silicon atoms are satisfied by having hydrogen atoms attached thereto. One suitable method of preparing such compositions comprises effecting an interchange or equilibrium reactance between (1) the product of hydrolysis of a halogenosilane corresponding to the formula H$_2$SiX$_2$ where X represents a halogen selected from the class consisting of chlorine and bromine, and (2) the product of hydrolysis of a halogenosilane corresponding to the formula (R)$_3$SiX where R is a member of the class consisting of hydrogen and lower monovalent hydrocarbon radicals and X has the same meaning as above given. To obtain liquid materials comprising a mixture of different linear hydrogen polysiloxanes corresponding to the formula VII 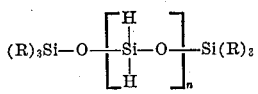

(where R has the meaning given above in connection with Formula III and the value for $n$ in said formula being equal to at least 1), the halogenosilanes which are hydrolyzed separately or admixed to form these hydrolyzates are employed in the ratio of 1 or more mols of H$_2$SiX$_2$ (for example, from 2 to 300 mols thereof) for each two mols of (R)$_3$SiX.

A more specific embodiment of the method features of our invention comprises hydrolyzing a mixture of trimethylchlorosilane (or trimethylbromosilane) and dichlorosilane (or dibromosilane), the said chlorosilanes being present in the said mixture in the ratio of about .40 mol of the former to at least 1 mol, usually at least 2 mols (for example, from 3 to 199 or more mols), of the latter, and effecting a condensation reaction between the resulting mixed products of hydrolysis of the said halogenosilanes until there has been obtained a liquid or oily mixture of linear hydrogen polysiloxanes at least some, generally a preponderant proportion of which, correspond to the general formula VIII 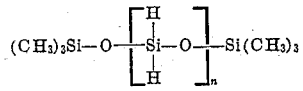

where $n$ represents an integer which is at least 5, usually at least 10. The liquid or oily mixture contains a plurality of different linear compounds embraced by the above formula.

Another method by which the fluid compositions represented by Formula VIII may be prepared comprises (1) mixing together (a) hexamethyldisiloxane and (b) a product of hydrolysis of dichlorosilane (H$_2$SiCl$_2$) or dibromosilane ($H_2SiBr_2$), (2) cleaving siloxane linkages of the ingredients of (a) and (b), (3) forming silanol derivatives of the cleaved compounds, and (4) effecting a condensation reaction between the said silanol derivatives, the steps of (2), (3) and (4) being carried out substantially concomitantly or simultaneously. Instead of using the entire product of hydrolysis of the dihalogenosilane, we may employ, for example, a previously isolated cyclopolysiloxane corresponding to the general formula ($H_2SiO$)$_n$ where $n$ is an integer which is, for example, at least 4, or mixtures thereof or hydrolyzates containing any or all of the cyclopolysiloxanes. The poly-siloxanes embraced by the above formula [($H_2SiO$)$_n$] can be obtained by hydrolyzing, for example, dichlorosilane.

Sulfuric acid is a suitable agent for use in effecting the simultaneous or almost simultaneous reactions set forth under steps (2), (3) and (4) above. This method is more fully described in the copending application of Robert O. Sauer, Serial No. 656,163, filed March 21, 1946, and assigned to the same assignee as the present invention. Although other acids, for instance, hydrochloric acid, phosphoric acid, etc., may also be used for this purpose, hydrochloric acid is preferred.

In order that those skilled in the art better may understand how the present invention may be practiced and how the liquid compositions claimed herein may be prepared, the following examples are given by way of illustration and not by way of limitation. All parts are by weight.

*Example 1*

About 20 parts trimethylchlorosilane was added to 80 parts dichlorosilane ($H_2SiCl_2$) and the mixture was hydrolyzed by pouring it first into cold concentrated hydrochloric acid and, thereafter, the resulting oil was immediately poured into an amount of water considerably in excess of that calculated as necessary to hydrolyze all the chlorosilanes. The oil was extracted from the water with diethyl ether and the ether evaporated under vacuum at room temperature. There remained behind an oil which had a viscosity of approximately 10 centistokes. The viscosity of this oil at room temperature (about 25° C.) and at −80° C. was tested and found to be substantially the same, the actual viscosity at −80° C. being less than about 50 per cent greater than the viscosity at room temperature. The viscosity-temperature coefficient was lower, when compared at the above two temperatures, than the viscosity-temperature coefficient of a liquid methyl polysiloxane obtained by hydrolyzing a mixture of chlorosilanes comprising dimethyl dichlorosilane and trimethyl chlorosilane in the approximate molar proportions employed in the foregoing example.

Extended contact of this oil with concentrated HCl or concentrated $H_2SO_4$ caused it to evolve hydrogen and gel. This gel formation in the presence of these concentrated acids was probably due to the replacement of some of the hydrogen atoms by oxygen with the result that some cross-linking occurred.

Oils produced as described in the foregoing Example 1 have been found to be still stable at room temperatures after 18 months. They gel slowly in the presence of strong acids and decompose in contact with alkali.

*Example 2*

Oils having the general formula

IX
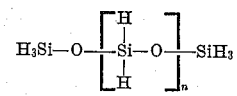

where $n$ is an integer equal to at least 1, are prepared by cohydrolyzing dichlorosilane ($H_2SiCl_2$) and chlorosilane ($H_3SiCl$) in the same manner as employed in Example 1.

*Example 3*

When triphenyl chlorosilane and dichlorosilane are cohydrolyzed using the procedure outlined in Example 1, there may be obtained liquid linear hydrogen polysiloxanes corresponding to the general formula X
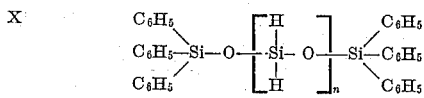

where $n$ is an integer equal to at least 1.

It will be noted that Example 1 is illustrative of a method which comprises contacting with aqueous concentrated hydrochloric acid solution a mixture of trimethylchlorosilane and dichlorosilane, the said chlorosilanes being present in the said mixture in the ratio of about 0.4 mol of the former to at least 2 mols of the latter, allowing the resulting products of hydrolysis of the said chlorosilanes to intercondense in the presence of the hydrochloric acid until there has been obtained a liquid or oily material composed of a plurality of different linear hydrogen polysiloxanes corresponding to the general Formula VIII where $n$ represents an integer having an average value of at least 10, and separating the said oily material from the aqueous acid phase. Those skilled in the art will fully appreciate that this method may be employed in the preparation of liquid hydrogen polysiloxanes corresponding to Formula III by using dichlorosilane and a compound corresponding to the general formula (R)$_3$SiCl where R has the meaning given previously with regard to Formula III.

It will be apparent to those skilled in the art that these novel liquid polysiloxanes may be further modified by incorporating, for example, in the hydrolyzable mixture comprising dichlorosilane and trimethyl chlorosilane, other halogenosilanes wherein the latter halogenosilanes comprise a silicon atom having attached thereto two halogens and at least one hydrocarbon radical where the other valence of the silicon atom may be satisfied by another hydrocarbon radical or by hydrogen. In such a case, the liquid polysiloxane composition might be described as follows: A liquid linear polysiloxane containing the structural units

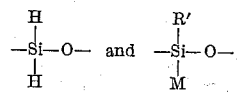

where one of the terminal silicon atoms of the linear chain is of the general formula (R)$_3$Si—O— and the other terminal silicon atom is of the general formula —Si(R)$_3$ where R and R' are each a member of the class consisting of hydrogen and lower monovalent hydrocarbon radicals, and M is a lower monovalent hydrocarbon radical. For example, in the hydrolysis of the chlorosilanes employed for preparing compositions embraced by Formula VIII, dimethyl dichlorosilane or diphenyl dichlorosilane or methyl dichlorosilane ($CH_3SiHCl_2$) may be added to the dichlorosilane ($H_2SiCl_2$) prior to cohydrolysis with for example, trimethyl chlorosilane to yield liquid polysiloxanes corresponding to the above description.

What we claim as new and desire to secure by Letters Patent of the United States is:

1. A fluid composition consisting essentially of a liquid mixture of linear polysiloxanes wherein all the valences, exclusive of the valences satisfied by oxygen, of all the silicon atoms intermediate to the terminal silicon atoms have hydrogen atoms attached thereto, the said terminal silicon atoms each having attached thereto by carbon-silicon linkages three hydrocarbon radicals selected from the class consisting of alkyl, aryl, alkaryl, and aralkyl radicals.

2. A fluid composition consisting essentially of an oily mixture of linear hydrogen polysiloxanes, at least some of which correspond to the general formula

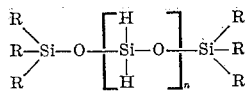

where R is a monovalent hydrocarbon radical selected from the class consisting of alkyl, aryl, alkaryl, and aralkyl radicals, and $n$ represents an integer equal to from 5 to 500, the said oily mixture containing a plurality of different linear compounds embraced by the above formula.

3. A fluid composition consisting essentially of an oily mixture of linear hydrogen polysiloxanes, at least some of which correspond to the general formula

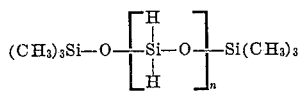

where $n$ represents an integer between 10 and 500, said composition having a viscosity change which is less than 50 per cent when said viscosity is measured at 25° C. and at —80° C.

4. A lubricant having a low viscosity-temperature coefficient consisting essentially of an oily mixture of linear hydrogen polysiloxanes, at least some of which correspond to the general formula

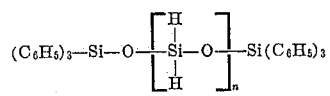

where $n$ represents an integer between 10 and 500.

5. An oily composition consisting essentially of a preponderant proportion of different liquid linear hydrogen polysiloxanes, the individual members of which correspond to the general formula

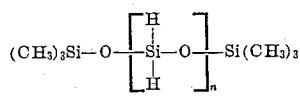

where $n$ represents an integer between 10 and 50, said composition having a viscosity change which is less than 50 per cent when said viscosity is measured at 25° C. and at —80° C.

6. The method of producing a fluid composition consisting essentially of a liquid mixture of linear hydrogen polysiloxane wherein all the valences, exclusive of the valences satisfied by oxygen, of all the silicon atoms intermediate to the terminal silicon atoms have hydrogen atoms attached thereto, and the terminal silicon atoms have all their valences, exclusive of the valences satisfied by oxygen, satisfied by a monovalent hydrocarbon radical selected from the class consisting of alkyl, aryl, alkaryl, and aralkyl radicals, which method comprises (a) hydrolyzing a mixture of chlorosilanes in an amount of water in excess of that required to effect hydrolysis of all the chlorosilanes, the said mixture of halogenosilanes comprising (1) a halogenosilane corresponding to the general formula $H_2SiX_2$ and (2) a halogenosilane corresponding to the general formula $(R)_3SiX$ where R is a monovalent hydrocarbon radical selected from the class consisting of alkyl, aryl, alkaryl, and aralkyl radicals, and X in (1) and (2) represents a halogen selected from the class consisting of chlorine and bromine, and (b) isolating the aforementioned fluid composition.

7. The method which comprises producing a fluid composition consisting essentially of an oily mixture of linear hydrogen polysiloxanes, at least some of which correspond to the general formula

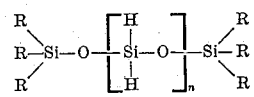

where R is a monovalent hydrocarbon radical selected from the class consisting of alkyl, aryl, alkaryl, and aralkyl radicals, and $n$ represents an integer equal to from 1 to 500, which method comprises (a) hydrolyzing in an excess of water and thereafter allowing to condense a mixture of chlorosilanes comprising (1) dichlorosilane and (2) a chlorosilane having the general formula $(R)_3SiX$ where R has the meaning given above and X is a halogen selected from the class consisting of chlorine and bromine, and (b) isolating the aforementioned fluid composition from the hydrolysis mixture.

8. The method which comprises (1) hydrolyzing in an excess of water a mixture of trimethylchlorosilane and dichlorosilane, the said chlorosilanes being present in the said mixture in a molar ratio of from 0.4 mol of the former to at least 1 mol of the latter, thereby effecting a condensation reaction between the resulting mixed product of hydrolysis of the said chlorosilanes until there has been obtained an oily mixture of linear hydrogen polysiloxanes, at least some of which correspond to the general formula

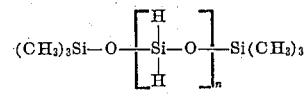

where $n$ represents an integer which is equal to from 5 to 500, the said oily mixture containing a plurality of different linear compounds embraced by the above formula, and (2) isolating the aforementioned oily mixture of linear hydrogen polysiloxanes.

9. The method which comprises (1) contacting for a brief time with an aqueous concentrated hydrochloric solution, a mixture of trimethylchlorosilane and dichlorosilane, the said chlorosilanes being present in the mixture in the ratio of about 0.4 mol of the former to at least 2 mols of the latter, (2) immediately thereafter pouring the resulting acid mixture into an amount of water in excess of that required to hydrolyze completely all the chlorosilanes, thereby to obtain an oily material consisting essentially of a plurality of different liquid linear hydrogen polysiloxanes corresponding to the general formula

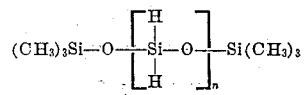

where $n$ represents an integer having an average value of from 10 to 500, and (3) separating the said oily material from the aqueous acid phase and purifying the oily product thereby obtained.

DONALD F. WILCOCK.
DALLAS T. HURD.

REFERENCES CITED

The following references are of record in the file of this patent:

UNITED STATES PATENTS

| Number | Name | Date |
|---|---|---|
| 2,398,187 | McGregor | Apr. 9, 1946 |
| 2,398,672 | Sauer | Apr. 16, 1946 |
| 2,491,843 | Wilcox | Dec. 20, 1949 |

OTHER REFERENCES

Stock et al.: Berichte, vol. 52 (1919), page 719.
Volnov: "Jour. Gen. Chem." (U. S. S. R.), vol. 10 (1940), pages 1600–1604 (translation received Mar. 21, 1945, 7 pages, pages 2 and 3 especially).